US006957217B2

(12) United States Patent
Raverdy et al.

(10) Patent No.: US 6,957,217 B2
(45) Date of Patent: Oct. 18, 2005

(54) SYSTEM AND METHOD FOR SELECTIVELY PROVIDING INFORMATION TO A USER DEVICE

(75) Inventors: Pierre-Guillaume Raverdy, Santa Clara, CA (US); Nigel A. J. Davies, Lancaster (GB); Oliver D. Storz, Sankt Georgen (GB); Christos Efstratiou, Lancaster (GB)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 553 days.

(21) Appl. No.: 09/899,437

(22) Filed: Jul. 5, 2001

(65) Prior Publication Data

US 2002/0068573 A1 Jun. 6, 2002

Related U.S. Application Data

(60) Provisional application No. 60/250,944, filed on Dec. 1, 2000, and provisional application No. 60/250,947, filed on Dec. 1, 2000.

(51) Int. Cl.[7] .............................................. G06F 17/30
(52) U.S. Cl. ....................................................... 707/9
(58) Field of Search .............. 707/9, 104.1; 455/414.1; 715/700; 709/201, 232; 725/86; 463/1

(56) References Cited

U.S. PATENT DOCUMENTS

| | | | | |
|---|---|---|---|---|
| 5,602,916 A | * | 2/1997 | Grube et al. ................ 380/270 |
| 5,642,303 A | * | 6/1997 | Small et al. ................ 708/109 |
| 5,732,214 A | * | 3/1998 | Subrahmanyam ........... 709/227 |
| 5,785,043 A | * | 7/1998 | Cyrus et al. ................ 600/525 |
| 5,929,848 A | * | 7/1999 | Albukerk et al. ........... 715/700 |
| 6,300,873 B1 | * | 10/2001 | Kucharczyk et al. ..... 340/568.1 |
| 6,311,214 B1 | * | 10/2001 | Rhoads ....................... 709/217 |
| 6,493,671 B1 | * | 12/2002 | Ladd et al. ................. 704/270 |
| 6,584,095 B1 | * | 6/2003 | Jacobi et al. ............... 370/352 |
| 6,591,315 B1 | * | 7/2003 | Bhagat et al. ............... 710/38 |
| 6,608,549 B2 | * | 8/2003 | Mynatt et al. .............. 340/5.8 |
| 6,614,350 B1 | * | 9/2003 | Lunsford et al. ........ 340/572.1 |
| 6,650,761 B1 | * | 11/2003 | Rodriguez et al. .......... 382/100 |
| 6,659,861 B1 | * | 12/2003 | Faris et al. .................... 463/1 |
| 6,782,253 B1 | * | 8/2004 | Shteyn et al. ............ 455/414.1 |

OTHER PUBLICATIONS

Chen et al, An RTP–based Synchronized Hypermedia Live Lecture System for Distance Education, PROC. seventh ACM International Conference on Multimedia (Part 1), Oct. 1999, pp 91–99. ISBN: 1–58113–151–8.*

* cited by examiner

*Primary Examiner*—Wayne Amsbury
(74) *Attorney, Agent, or Firm*—Gregory J. Koerner; Redwood Patent Law

(57) ABSTRACT

A system and method for selectively providing information to a user device includes an event server that provides restricted access to various types of event content information and services related to a particular event. A wireless portable user device may provide an access code to the event server at a particular event location through a wireless base station that is coupled to a local area network. A system user may thereby utilize the user device to access the event server for downloading appropriate event content information and related services until the foregoing access code expires.

36 Claims, 9 Drawing Sheets

SYSTEM AND METHOD FOR SELECTIVELY PROVIDING INFORMATION TO A USER DEVICE

CROSS-REFERENCE TO RELATED APPLICATIONS

This application relates to, and claims priority in, U.S. Provisional Patent Application Ser. No. 60/250,944, entitled "Infrastructure To Enhance User Experience At Live Events," filed on Dec. 1, 2000, and to U.S. Provisional Patent Application Ser. No. 60/250,947, entitled "Video Streaming To Personal Wireless Devices For Live Event Enhancement," filed on Dec. 1, 2000. The foregoing related applications are commonly assigned, and are hereby incorporated by reference.

BACKGROUND SECTION

1. Field of the Invention

This invention relates generally to techniques for accessing information, and relates more particularly to a system and method for selectively providing information to a user device.

2. Description of the Background Art

Implementing effective methods for accessing information is a significant consideration for designers and manufacturers of contemporary electronic devices. However, effectively accessing information with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively accesses, stores, displays, and manipulates digital image data may benefit from an efficient implementation because of the large amount and complexity of the digital data involved.

Due to growing demands on system resources and substantially increasing data magnitudes, it is apparent that developing new techniques for accessing information is a matter of concern for related electronic technologies. Therefore, for all the foregoing reasons, developing effective systems for accessing information remains a significant consideration for designers, manufacturers, and users of contemporary electronic devices.

SUMMARY

In accordance with the present invention, a system and method are disclosed for selectively providing information to a user device. In one embodiment, an electronic system may preferably include, but is not limited to, a user device, a base station, a local area network (LAN), an event server, and an Internet network. The user device may preferably be implemented as any appropriate type of electronic device. For example, the user device may be configured as a portable wireless telecommunications device.

In certain embodiments, the user device may preferably communicate bidirectionally with the base station which may include a radio-frequency transceiver system to transmit and receive wireless communications to and from the user device. The base station may preferably be coupled to the LAN which may preferably be implemented at a particular event location. For example, the LAN and the base station may be located at a movie theater, a sporting venue, or a sports bar. In certain embodiments, the electronic system may include multiple base stations coupled to one or more different LANs.

In one embodiment, the LAN may preferably communicate directly with the event server which may preferably include various types of event services or event information related to a particular event or event location. In another embodiment, the LAN may preferably include a computer device for connecting to the Internet which may then responsively communicate with the event server. In accordance with the present invention, the user device may thus access relevant event information from the event server via the LAN and the base station. In certain circumstances, the user device may also communicate directly with the Internet to access the event server.

During the utilization of the foregoing embodiment, a system user may initially purchase an admission to a particular event or event location. The system user may then preferably receive an access code corresponding to the particular event or event location. Subsequently, the system user may preferably enter the event location and there determine whether to perform a login procedure with the user device to thereby gain access to the event server. During the login procedure, the user device may preferably provide the foregoing access code to the event server. In certain embodiments, the user device may also provide various other types of user data to the event server.

The user device may then preferably perform a configuration procedure with configuration information downloaded from the event server. In addition, when appropriate, the user device may also update device application software to correspond to a latest software version for the particular event or event location. The user device may then preferably access and utilize various restricted services and restricted content information relating to the particular event from the event server. In certain embodiments, the event server may preferably regulate access to the various restricted services and content information based upon time-stamped access capabilities corresponding to the access code provided by the user device to the event server during the foregoing login procedure.

In accordance with one embodiment of the present invention, the event server may periodically determine whether access rights for the user device have expired. For example, an access rights manager of the event server may preferably monitor corresponding time-stamped capabilities to determine whether various access rights of the particular user device have expired. In one embodiment, when the event server determines that the access rights of a user device have expired, then access to the restricted event content and services may preferably be terminated. The present invention thus provides an improved system and method for selectively providing information to a user device.

DETAILED DESCRIPTION

The present invention relates to an improvement in information management techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for selectively providing information to a user device, and may preferably include an event server that provides restricted access to various types of event content information and services related to a particular event. A wireless portable user device may provide an access code to the event server at a particular event location through a wireless base station that is coupled to a local area network. A system user may thereby utilize the user device to access the event server for downloading appropriate event content information and related services until the foregoing access code expires.

Figure 1:
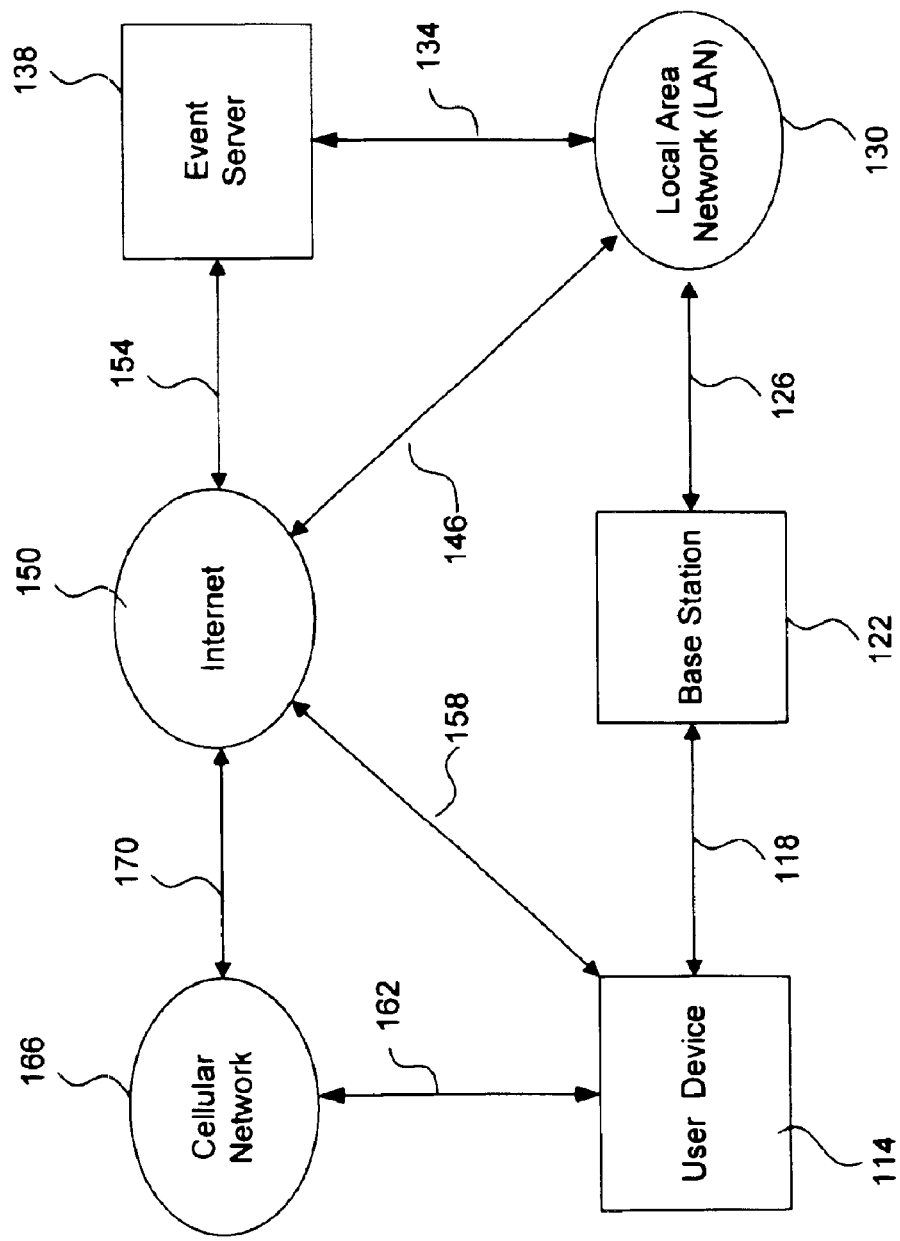
FIG. 1 is a block diagram of an electronic system, in accordance with one embodiment of the present invention.

Referring now to FIG. 1, a block diagram of an electronic system 110 is shown, in accordance with one embodiment of the present invention. In the FIG. 1 embodiment, electronic system 110 may preferably include, but is not limited to, a user device 114, a base station 122, a local area network (LAN) 130, an event server 138, an Internet network 150, and a cellular network 166. In alternate embodiments, electronic system 110 may readily be implemented using various components and configurations in addition to, or instead of, those discussed in conjunction with the FIG. 1 embodiment. For example, in certain embodiments, electronic system 110 may readily be configured to include multiple base stations 122 and/or multiple event servers 138.

In the FIG. 1 embodiment, user device 114 may preferably be implemented as any appropriate type of electronic device. For example, user device 114 may be configured as a portable wireless telecommunications device. The configuration and functionality of user device 114 is further discussed below in conjunction with FIGS. 2 and 3.

In the FIG. 1 embodiment, user device 114 may preferably communicate bidirectionally with base station 122 via path 118. Base station 122 may preferably be implemented in any appropriate manner. For example, base station 122 may include a radio-frequency transceiver system to transmit and receive wireless communications to and from user device 114. Base station 122 may preferably be coupled to LAN 130 via path 126.

In the FIG. 1 embodiment, LAN 130 may preferably be implemented at a particular event location. For example, LAN 130 and base station 122 may be located at a movie theater, a sporting venue, or a sports bar. In certain embodiments, electronic system 110 may include multiple base stations 122 coupled to one or more different LANs 130. For example, a movie theater may include an entrance LAN 130 outside the theater, a lobby LAN 130 in the theater lobby, and a screening room LAN 130 for the area in which movies are displayed.

In the FIG. 1 embodiment, LAN 130 may preferably communicate directly with event server 138 via path 134. Event server 138 may preferably include various types of event services or event information related to a particular event or event location. In certain embodiments, LAN 130 may preferably include a computer device (not shown) for connecting to Internet 150 via path 146. Internet 150 may then responsively communicate with event server 138 via path 154. The implementation and functionality of event server 138 is further discussed below in conjunction with FIGS. 5 and 6.

In accordance with the present invention, user device 114 may thus access relevant event information from event server via base station 122 and LAN 130. In certain circumstances, user device 114 may also communicate directly with Internet 150 via path 158 to access event server 138. For example, user device 114 may be utilized to access event server 138 before or after attending a particular event location. In addition, user device 114 may also communicate with cellular network 166 via path 162 to thereby access Internet 150 and event server 138 via path 170.

Figure 2:
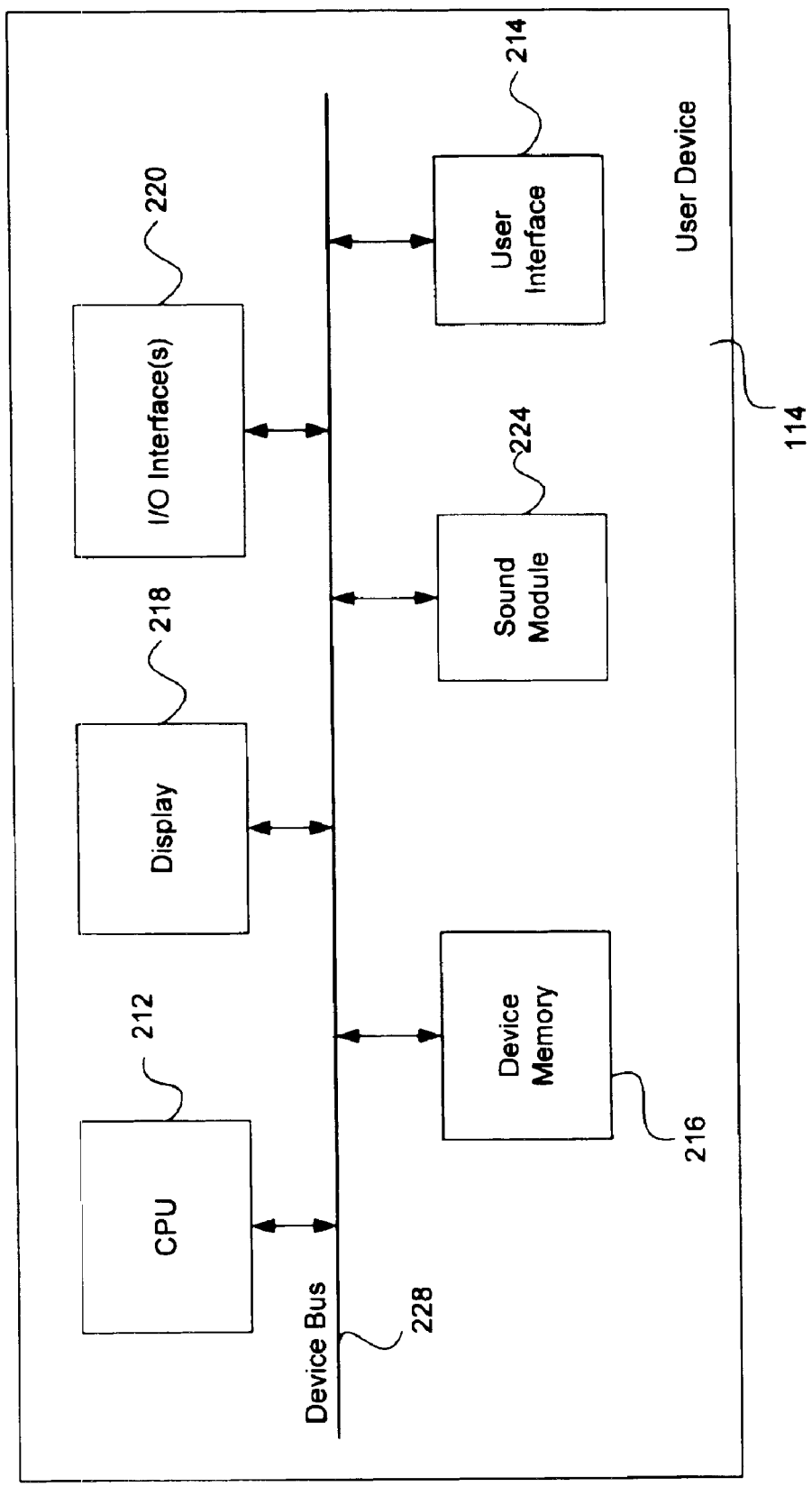
FIG. 2 is a block diagram for one embodiment of the user device of FIG. 1, in accordance with the present invention.

Referring now to FIG. 2, a block diagram for one embodiment of the FIG. 1 user device 114 is shown, in accordance with the present invention. In the FIG. 2 embodiment, user device 114 preferably includes, but is not limited to, a central processing unit (CPU) 212, a user interface 214, a device memory 216, a display 218, one or more input/output interface(s) (I/O interface(s)) 220, and a sound module 224. The foregoing components of user device 114 may preferably be coupled to, and communicate through, a device bus 228.

In alternate embodiments, user device 114 may readily be implemented using various components and configurations in addition to, or instead of, those discussed in conjunction with the FIG. 2 embodiment. In addition, user device 114 may be implemented as any desired type of electronic device. For example, in certain embodiments, user device 114 may include a personal digital assistant (PDA) device, a cellular telephone device, a computer device, or any portable electronic device that supports wireless electronic communications.

In the FIG. 2 embodiment, CPU 212 may be implemented to include any appropriate and compatible microprocessor device that preferably executes software instructions to thereby control and manage the operation of user device 114. The FIG. 2 display 218 preferably may include any effective type of display technology including a cathode-ray-tube monitor or a liquid-crystal display device.

In the FIG. 2 embodiment, I/O interface(s) 220 preferably may include one or more input and/or output interfaces to receive and/or transmit any required types of information by user device 114. For example, in the FIG. 2 embodiment, user device 114 may utilize I/O interface(s) 220 to bi-directionally communicate with various types of wireless communications devices through a wireless communications interface. The wireless communications interface may preferably include any effective means to remotely communicate with an external entity such as LAN 130 (FIG. 1) or Internet 150, to thereby exchange relevant information for successful operation of user device 114.

In addition, user device 114 may utilize the wireless communications interface to download various types of content information and other data from a wireless source such as base station 122 (FIG. 1). The foregoing wireless communications interface may be implemented using any appropriate wireless technology, including radio-frequency transmission, infrared transmission, or microwave transmission.

In the FIG. 2 embodiment, user device 114 may also utilize I/O interface(s) 220 to bi-directionally communicate with one or more distributed computer networks. For example, user device 114 may advantageously communicate with the Internet, a local area network, or other distributed computer networks to upload or download various types of information.

User device 114 may also utilize I/O interface(s) 220 to bi-directionally communicate with a host computer. For example, user device 114 may communicate with a personal computer device over a Universal Ser. Bus (USB) to effectively upload or download various types of information. Similarly, in the FIG. 2 embodiment, user device 114 may utilize I/O interface(s) 220 to bi-directionally communicate with a cellular telephone network to preferably transfer any desired information.

In the FIG. 2 embodiment, one or more removable storage media interfaces may preferably be utilized to receive or send any desired data for user device 114. For example, various types of removable storage media may provide means for bi-directional transfers of content information and other data between user device 114 and other appropriate entities. In certain embodiments, the removable storage media may include memory devices to support any desired type or combination of removable storage media. For example, the removable storage media may support memory sticks, flash memory devices, compact disks, mini-disks, or floppy disks.

In the FIG. 2 embodiment, device memory 216 may be implemented to include any combination of desired storage devices, including, but not limited to, read-only memory (ROM), random-access memory (RAM), and various types of non-volatile memory, such as floppy disks or hard disks. The contents and functionality of device memory 216 are further discussed below in conjunction with FIG. 3.

Sound module 224 preferably may include appropriate interfaces to support audio functionality for user device 114. For example, in certain embodiments, sound module 224 may include, but is not limited to, an audio processing module, a power amplifier, one or more speaker devices, and a microphone device.

In the FIG. 2 embodiment, user interface 214 may preferably include any effective means to allow a system user to communicate with user device 114. For example, user interface 214 may support a keyboard device, a wireless remote control device, a speech-recognition module with corresponding microphone, a graphical user interface with touch-screen capability, or a selection button array mounted externally on user device 114. The functionality and utilization of user device 114 is further discussed below in conjunction with FIG. 9.

Figure 3:
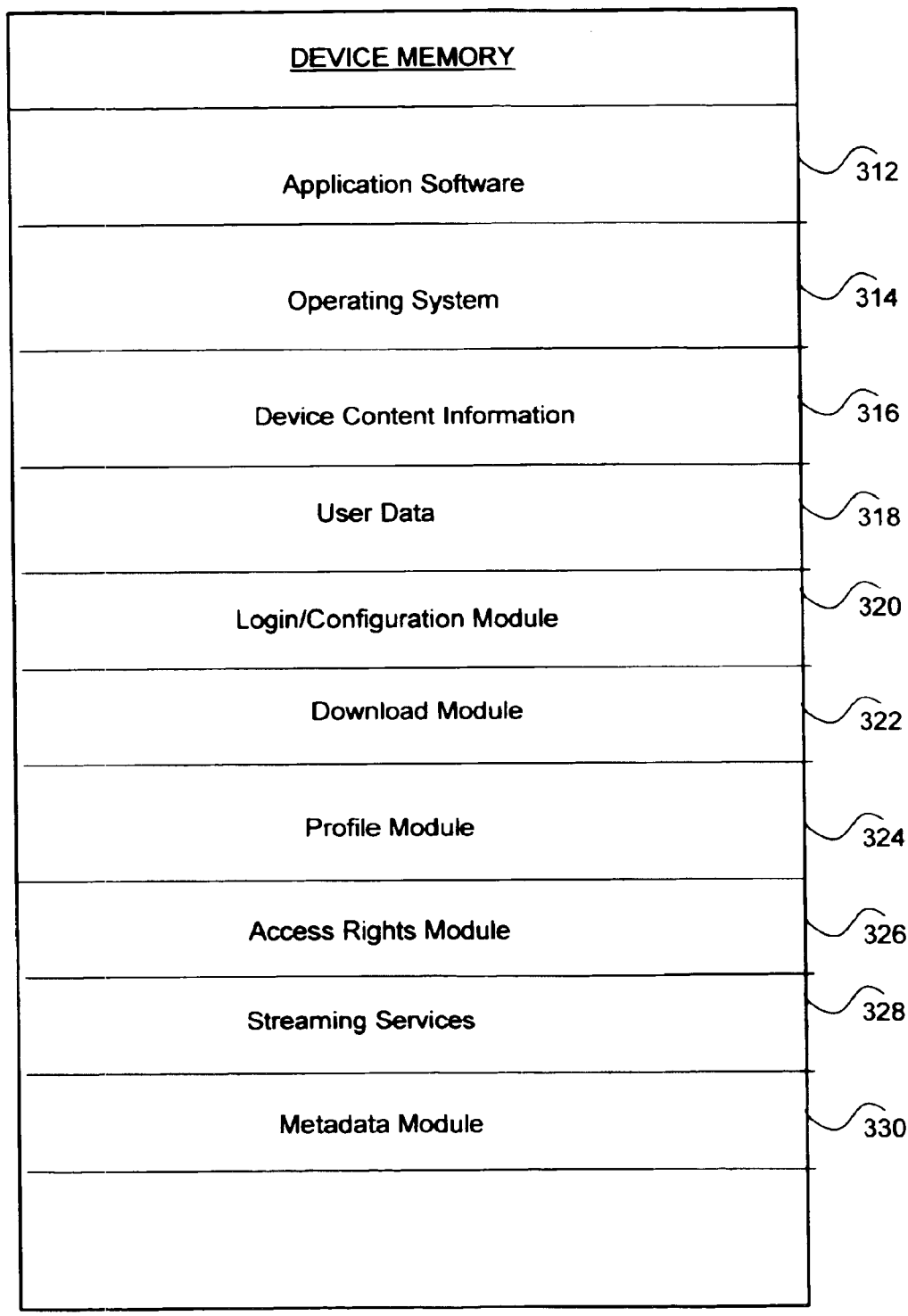
FIG. 3 is a block diagram for one embodiment of the device memory of FIG. 2, in accordance with the present invention.

Referring now to FIG. 3, a block diagram for one embodiment of the FIG. 2 device memory 216 is shown, in accordance with the present invention. In the FIG. 3 embodiment, device memory 216 preferably includes, but is not limited to, application software 312, an operating system 314, device content information 316, user data 318, a login/configuration module 320, a download module 322, a profile module 324, an access rights module 326, streaming services 328, and a metadata module 330. In alternate embodiments, device memory 216 may readily include various other components in addition to, or instead of, those components discussed in conjunction with the FIG. 3 embodiment.

In the FIG. 3 embodiment, application software 312 may include program instructions that are preferably executed by CPU 212 (FIG. 2) to perform various functions and operations for user device 114. The particular nature and functionality of application software 312 preferably varies depending upon factors such as the specific type and particular use of the corresponding user device 114. In the FIG. 3 embodiment, operating system 314 preferably controls and coordinates low-level functionality of user device 114. Device content information 316 preferably includes various types of data that is preferably stored in device memory 216. Device content information 316 preferably may include various types of image data or other types of information. User data 318 may preferably include any information pertaining to the utilization of user device 114 by one or more system users. User data 318 is further discussed below in conjunction with FIG. 4.

In the FIG. 3 embodiment, login/configuration module 320 may preferably initiate bidirectional communications between user device 114 and another entity in electronic system 110. For example, login/configuration module 320 may perform a login procedure to initially connect user device 114 to event server 138 via LAN 130 or via Internet 150. In the FIG. 3 embodiment, login/configuration module 320 may preferably initially provide an access code and other user data 318 to event server 138 which may responsively send appropriate configuration information to user device 114. Login/configuration module 320 may then perform a configuration procedure by utilizing the downloaded configuration information from event server 138 to effectively configure user device 114 in an optimal manner for accessing event server 138 in conjunction with a particular event at a corresponding event location.

In the FIG. 3 embodiment, download module 324 may preferably download and install appropriate application software 312 for use at a particular event or event location. Download module 324 may also initially determine whether a version of the application software 312 already exists on user device 114, and may then perform an update procedure if the current version of application software 312 is outdated.

In the FIG. 3 embodiment, profile module 324 may preferably create, edit, and manage one or more user profiles that may be transmitted to event server 138 during a login procedure. Profile module 324 may also maintain a list of profile recipients that have previously received one or more different user profiles from profile module 324. User profiles are further discussed below in conjunction with FIG. 4.

In the FIG. 3 embodiment, access rights module 326 may preferably communicate with event server 138 regarding access rights of user device 114. For example, access rights module 326 may preferably receive one or more time-stamped access capabilities for various services on event server 138. Access rights module 326 may also receive an encryption key for decrypting content information that has been encrypted by event server 138 prior to transmission to user device 114. Access rights are further discussed below in conjunction with FIGS. 4 and 8.

In the FIG. 3 embodiment, streaming services 328 may preferably support receiving, processing, and displaying various types of streaming video information from event server 138. Similarly, metadata module 330 may preferably support receiving, processing, and displaying various types of metadata information from event server 138. For example, metadata module 330 may manage and provide various types of ancillary information that is related to a particular event, such as event participant statistics or other background information.

Figure 4:
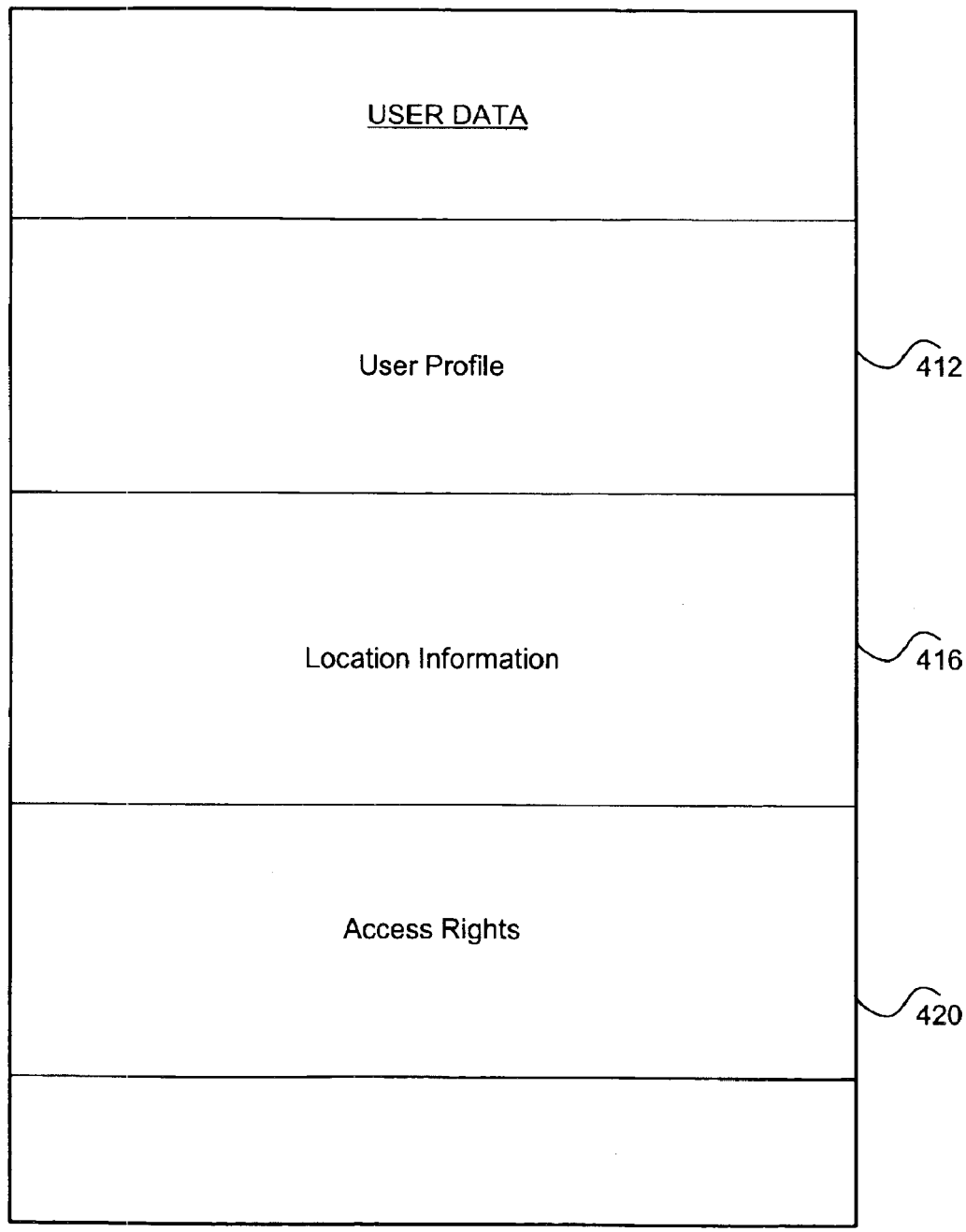
FIG. 4 is a block diagram for one embodiment of the user data of FIG. 3, in accordance with the present invention.

Referring now to FIG. 4, a block diagram for one embodiment of the FIG. 3 user data 318 is shown, in accordance with the present invention. In the FIG. 4 embodiment, user data 318 may include, but is not limited to, one or more user profiles 412, location information 416, and access rights 420. In alternate embodiments, user data 318 may readily include various other components in addition to, or instead of, those components discussed in conjunction with the FIG. 4 embodiment.

In the FIG. 4 embodiment, user profiles 412 may include any information related to a system user of user device 114. In certain embodiments, user profiles 412 may include a basic device profile that only describes basic functionality of user device 114. The foregoing device profile may typically be provided to event server 138 to gain access by a single user device 114 to basic services and content information.

In the FIG. 4 embodiment, user profiles 412 may also include one or more authentic user profiles that selectively describe various personal characteristics and usage traits of a particular system user of user device 114. In accordance with the present invention, user profiles 412 may also include one or more virtual user profiles that selectively describe various personal characteristics and usage traits of a fictitious system user of user device 114. In the FIG. 4 embodiment, user profiles 412 may also include one or more location profiles that describe a system configuration of a particular location (such as a system user's home network) to enable event server 138 to provide appropriate services and content information based upon a particular location profile.

In the FIG. 4 embodiment, location information 416 may preferably include any relevant information pertaining to one or more particular event locations. Location information 416 may be obtained in any suitable manner. For example, location information 416 may be provided by a system user by utilizing user interface 214 (FIG. 2). In accordance with the present invention, location information 416 may be provided to event server 138 in order to facilitate access to appropriate services and content information related to a corresponding event location.

In the FIG. 4 embodiment, access rights 420 may include one or more access codes for logging onto event server 138. Access codes may be obtained in any effective manner. For example, a system user may obtain an access code when purchasing admission to a particular event, and may responsively enter the access code using user interface 214. Alternately, an access code may be electronically transferred to user device 114. For example, a wireless "beaming" technique may utilize infrared or radio-frequency transmission to provide an access code to user device 114. Each of the foregoing access codes may preferably be associated with one or more time-stamped access capabilities for accessing corresponding services and content information from event server 138. Access rights to various types of server content information is further discussed below in conjunction with FIG. 8.

Figure 5:
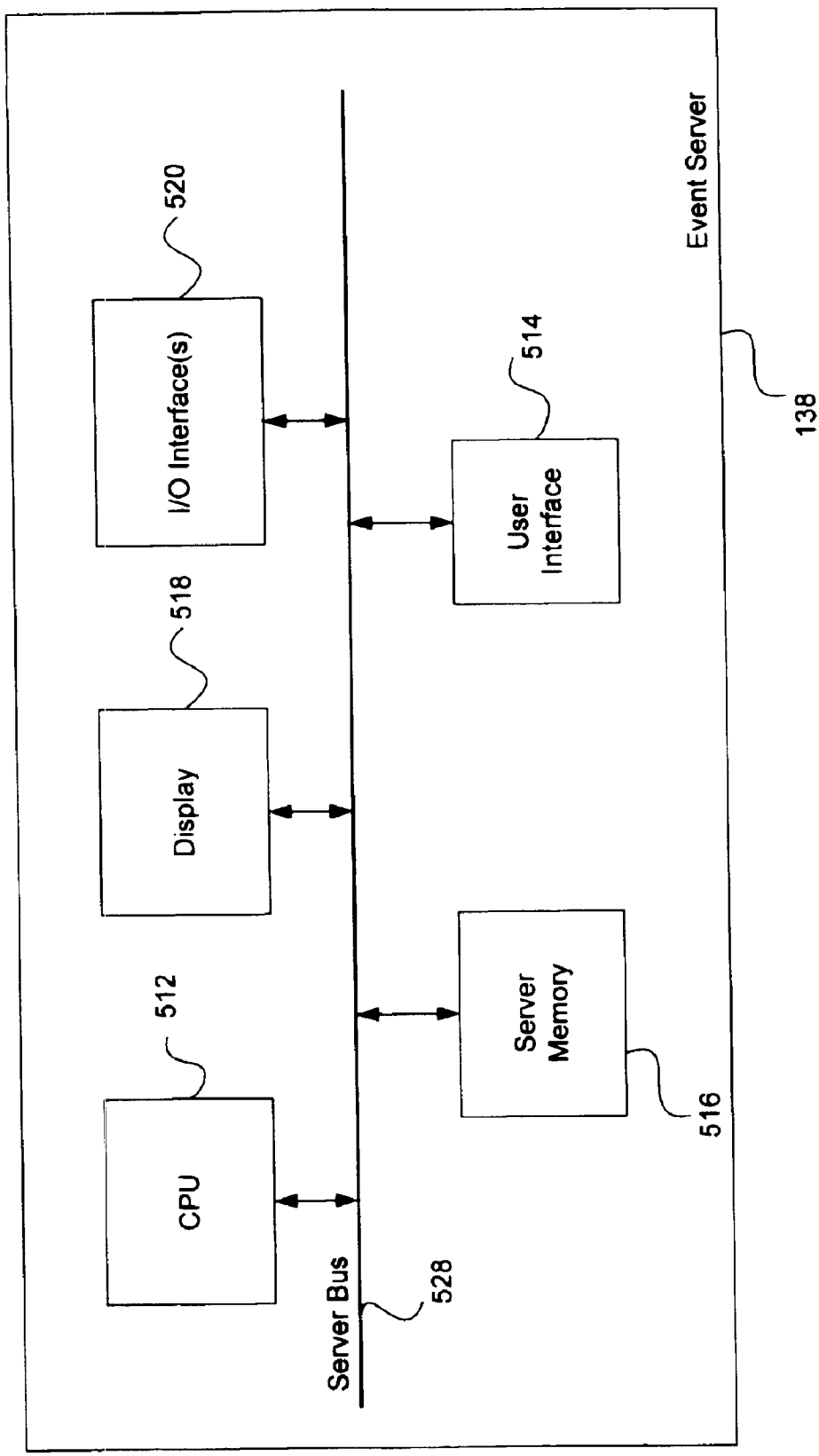
FIG. 5 is a block diagram for one embodiment of the event server of FIG. 1, in accordance with the present invention.

Referring now to FIG. 5, a block diagram for one embodiment of the FIG. 1 event server 138 is shown, in accordance with the present invention. In the FIG. 5 embodiment, event server 138 preferably includes, but is not limited to, a central processing unit (CPU) 512, a user interface 514, a server memory 516, a display 518, and one or more input/output interface(s) (I/O interface(s)) 520. The foregoing components of event server 138 may preferably be coupled to, and communicate through, a server bus 528.

In alternate embodiments, event server 138 may readily be implemented using various components and configurations in addition to, or instead of, those discussed in conjunction with the FIG. 5 embodiment. In the FIG. 5 embodiment, CPU 512 may be implemented to include any appropriate and compatible microprocessor device that preferably executes software instructions to thereby control and manage the operation of event server 138. The FIG. 5 display 518 preferably may include any effective type of display technology including a cathode-ray-tube monitor or a liquid-crystal display device.

In the FIG. 5 embodiment, I/O interface(s) 520 preferably may include one or more input and/or output interfaces to receive and/or transmit any required types of information by event server 138. For example, in the FIG. 5 embodiment, event server 138 may utilize I/O interface(s) 520 to bi-directionally communicate with various types of wireless communications devices through a wireless communications interface. The wireless communications interface may preferably include any effective means to remotely communicate with an external entity such as LAN 130 (FIG. 1) or Internet 150, to thereby exchange relevant information for successful operation of event server 138.

In addition, event server 138 may utilize the wireless communications interface to download various types of information and other data from a wireless source such as user device 114 (FIG. 1). The foregoing wireless communications interface may be implemented using any appropriate wireless technology, including radio-frequency transmission, infra-red transmission, or micro-wave transmission.

In the FIG. 5 embodiment, event server 138 may also utilize I/O interface(s) 520 to bi-directionally communicate with one or more distributed computer networks. For example, event server 138 may advantageously communicate with the Internet, a local area network such as LAN 130, or other distributed computer networks to upload or download various types of information.

In the FIG. 5 embodiment, server memory 516 may be implemented to include any combination of desired storage devices, including, but not limited to, read-only memory (ROM), random-access memory (RAM), and various types of non-volatile memory, such as floppy disks or hard disks. The contents and functionality of server memory 516 are further discussed below in conjunction with FIG. 6.

In the FIG. 5 embodiment, user interface 514 may preferably include any effective means to allow a system user to communicate with event server 138. For example, user interface 514 may support a keyboard device, a display device, and/or other devices. The functionality and utilization of event server 138 is further discussed below in conjunction with FIG. 9.

Figure 6:
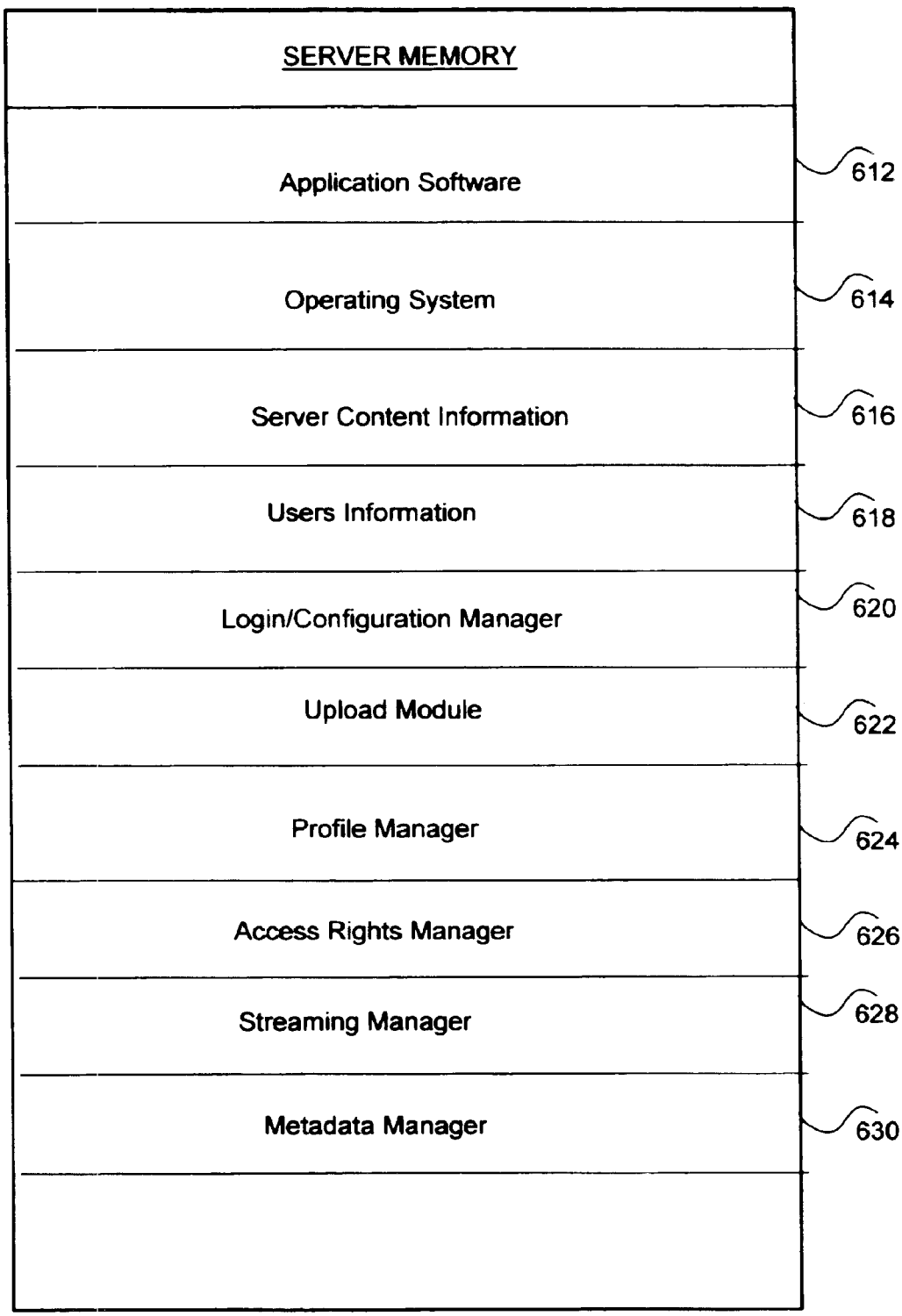
FIG. 6 is a block diagram for one embodiment of the server memory of FIG. 5, in accordance with the present invention.

Referring now to FIG. 6, a block diagram for one embodiment of the FIG. 5 server memory 516 is shown, in accordance with the present invention. In the FIG. 6 embodiment, server memory 516 preferably includes, but is not limited to, application software 612, an operating system 614, server content information 616, users information 618, a login/configuration manager 620, an upload module 622, a profile manager 624, an access rights manager 626, a streaming manager 628, and a metadata manager 630. In alternate embodiments, server memory 516 may readily include various other components in addition to, or instead of, those components discussed in conjunction with the FIG. 6 embodiment.

In the FIG. 6 embodiment, application software 612 may include program instructions that are preferably executed by CPU 512 (FIG. 5) to perform various functions and operations for event server 138. The particular nature and functionality of application software 612 preferably varies depending upon factors such as the specific type and particular use of the corresponding event server 138. In the FIG. 6 embodiment, operating system 614 preferably controls and coordinates low-level functionality of event server 138. Server content information 616 preferably includes various types of data and services that are preferably stored in server memory 516. The organization of server content information is further discussed below in conjunction with FIG. 8. Users information 618 may preferably include information pertaining to various systems users. Users information 618 is further discussed below in conjunction with FIG. 7.

In the FIG. 6 embodiment, login/configuration manager 620 may preferably manage bi-directional communications between event server 138 and another entity in electronic system 110. For example, login/configuration manager 620 may participate in a login procedure to initially connect a user device 114 to event server 138 via LAN 130 or via Internet 150 (see FIG. 1). In the FIG. 6 embodiment, login/configuration manager 620 may preferably initially receive an access code and other user data 318 from a user device 114. Login/configuration manager 620 may then preferably participate in a configuration procedure by responsively providing appropriate configuration information to the particular user device 114. The user device 114 may then utilize the configuration information to effectively configure the user device 114 in an optimal manner for accessing event server 138 in conjunction with a particular event at a corresponding event location.

In the FIG. 6 embodiment, upload module 624 may preferably provide appropriate device application software 312 (FIG. 2) for use at a particular event or event location to user device 114. In the FIG. 6 embodiment, profile manager 624 may preferably manage and utilize one or more user profiles 412 that may be transmitted to event server 138 during a login procedure. Profile manager 624 may also maintain a list of one or more location profiles that each correspond to a particular event location. Event server 138 may preferably utilize the location profiles in conjunction with location information 416 (FIG. 4) from a user device 114 to provide appropriate server content information to a user device 114.

In the FIG. 6 embodiment, access rights manager 626 may preferably communicate with user device 114 regarding access rights of a particular system user. For example, access rights manager 626 may preferably provide one or more time-stamped access capabilities to user device 114 for various services on event server 138. Access rights manager 626 may also provide an encryption key for decrypting content information that has been encrypted by event server 138 prior to transmission to user device 114. Access rights to server content information 616 are further discussed below in conjunction with FIG. 8.

In the FIG. 6 embodiment, streaming manager 628 may preferably support processing and transmitting various types of streaming video information from event server 138. Similarly, metadata manager 630 may preferably support processing and transmitting various types of metadata information from event server 138. For example, metadata manager 630 may manage and provide various types of ancillary information that is related to a particular event, such as event participant statistics or other background information.

Figure 7:
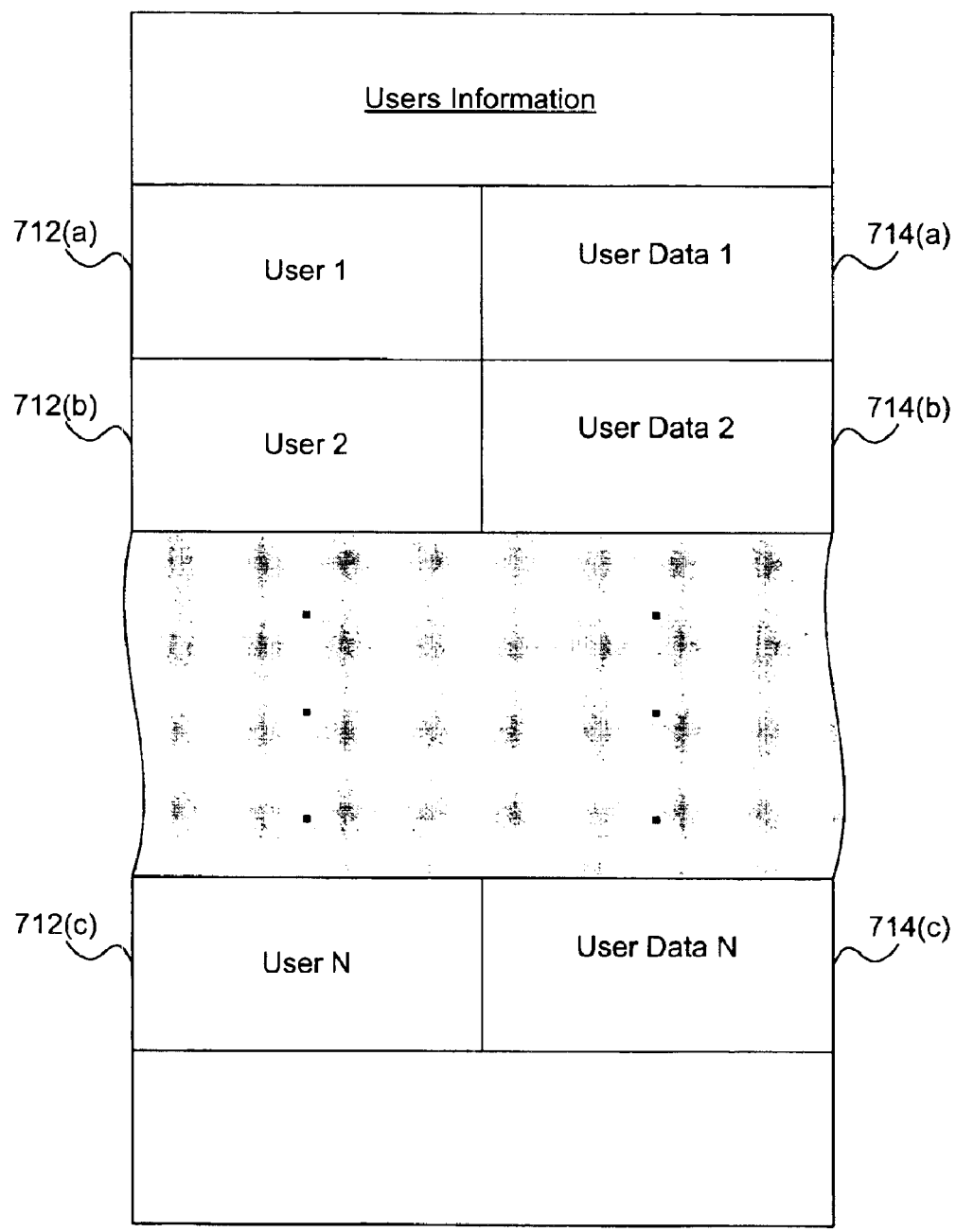
FIG. 7 is a block diagram for one embodiment of the users information of FIG. 6, in accordance with the present invention.

Referring now to FIG. 7, a block diagram for one embodiment of the FIG. 6 users information 618 is shown, in accordance with the present invention. In alternate embodiments of the present invention, users information 618 may readily be implemented to include various other configurations, and may also include various items and components that are different from those discussed in conjunction with the FIG. 7 embodiment.

In the FIG. 7 embodiment, as discussed above in conjunction with FIG. 6, event server 138 may store various sets of users information 618 that preferably may include individual sets of user data 1 (714(*a*)) through user data N (714(*c*)) which each preferably corresponds with a specific system user of a respective user device 114. In the FIG. 7 embodiment, the various system users may be identified as a respective user 1 (712(*a*)) through user N (712(*c*)). In the FIG. 7 embodiment, users information 618 may preferably include any type of information or data that may be received from any appropriate information source.

In certain embodiments, each user device 114 in electronic system 110 may provide event server 138 with various of types of user data 318 stored in the respective user devices 114 (see FIG. 4). For example, users information 618 may preferably include user profiles 412, location information 418, and access rights 420 from sets of user data 318 of the various user devices 114. Event server 138 may then advantageously refer to users information 618 in order to provide appropriate services and content information to the individual user devices 114.

Figure 8:
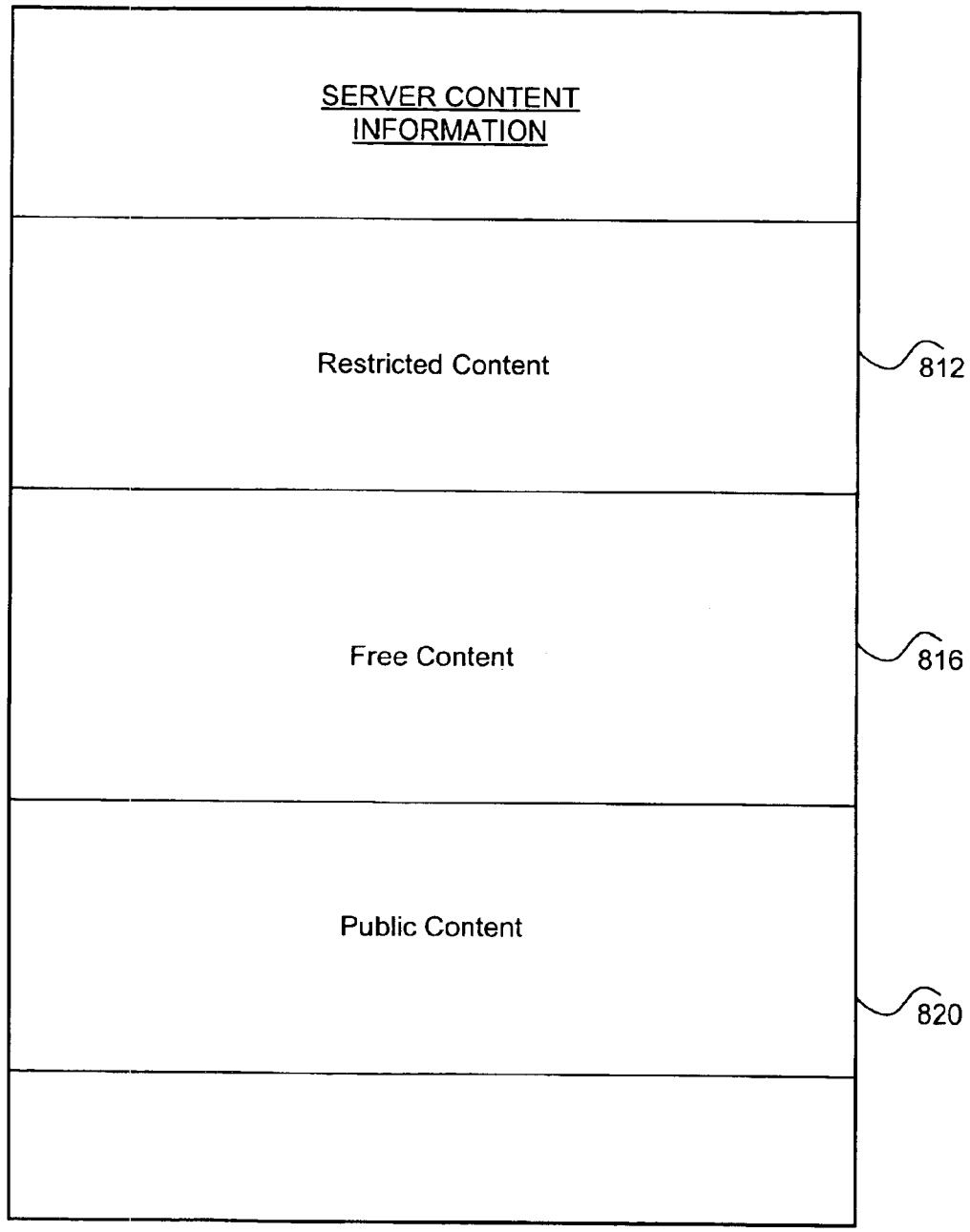
FIG. 8 is a block diagram for one embodiment of the server content information of FIG. 6, in accordance with the present invention.

Referring now to FIG. 8, a block diagram for one embodiment of the FIG. 6 server content information 616 is shown, in accordance with the present invention. In the FIG. 8 embodiment, server content information 616 may preferably include, but is not limited to, restricted content 812, free content 816, and public content 820. In alternate embodiments, server content information 616 may readily be implemented using various components and configurations in addition to, or instead of, those discussed in conjunction with the FIG. 8 embodiment.

In the FIG. 8 embodiment, restricted content 812 may preferably include various types of enhanced content information and services that event server 138 may preferably only transmit to those user devices 114 that provide an appropriate access code with unexpired access capabilities for accessing the enhanced restricted content 812. Gaining access to restricted content 812 may typically require additional monetary payment to a service provider.

In addition, free content 816 may preferably include various types of content information that event server 138 may transmit to any user devices 114 that provide an appropriate access code with unexpired access capabilities for accessing the free content 816. Gaining access to free content 816 may potentially not require additional monetary payment to a service provider.

Server content information 616 may also include public content 820 that may be accessed by anyone via user device 114. In the FIG. 8 embodiment, public content 820 is shown as part of server content information 616, however, in other embodiments, public content 820 may be accessed from any appropriate source. For example, public content 820 may be accessed directly from Internet 150 (FIG. 1) by utilizing user device 114.

Figure 9:
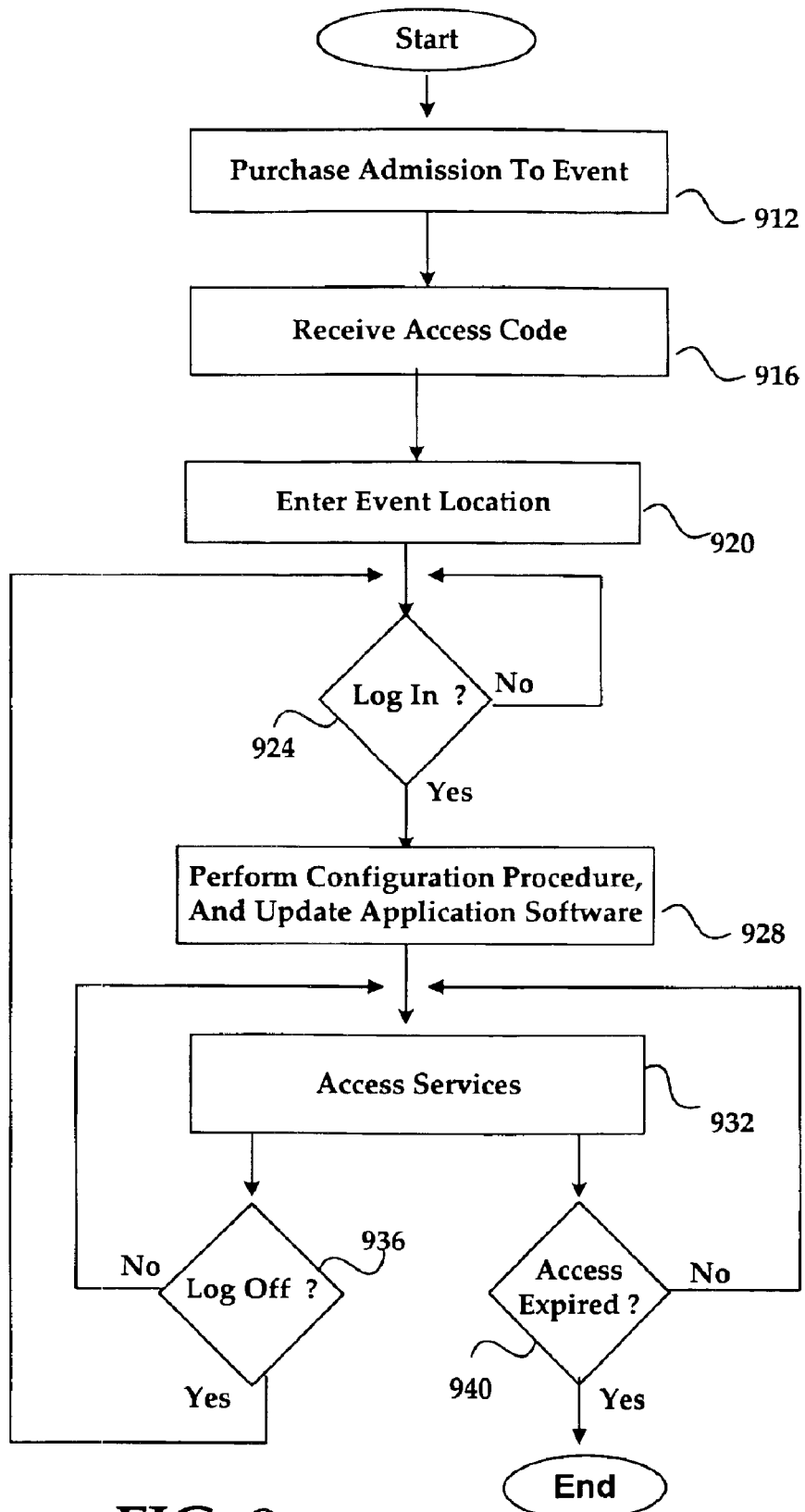
FIG. 9 is a flowchart of method steps for selectively providing information to a user device, in accordance with one embodiment of the present invention.

Referring now to FIG. 9, a flowchart of method steps for selectively providing information to a user device 114 is shown, in accordance with one embodiment of the present invention. The FIG. 9 example is presented for purposes of illustration, and, in alternate embodiments, the present invention may readily utilize various other steps and sequences than those discussed in conjunction with the FIG. 9 embodiment.

In the FIG. 9 embodiment, initially, in step 912, a system user may preferably purchase an admission to a particular event or event location. Then, in step 916 the system user may preferably receive an access code corresponding to the particular event or event location. In step 920, the system user may preferably enter the event location.

Next, in step 924, the system user may preferably determine whether to perform a login procedure with user device 114 to thereby gain access to event server 138. During the login procedure, user device 114 may preferably provide the foregoing access code received in step 916 to event server 138. In certain embodiments, user device 114 may also provide other user data 318 to event server 138.

In step 928, user device 114 may preferably perform a configuration procedure with configuration information downloaded from event server 138. In addition, when appropriate, user device 114 may also update application software 312 to correspond to a latest software version for the event or event location. Then, in step 932, user device 114 may preferably access and utilize various services and content information from event server 138. In the FIG. 9 embodiment, event server 138 may preferably regulate access to various services and content information based upon time-stamped access capabilities corresponding to the access code provided by user device 114 to event server 138 during the foregoing login procedure. In certain embodiments, a system user may utilize user device 114 to provide various types of user feedback to event server 138 regarding a current event or event location. In addition, a system user may also communicate with event server 138 to perform various event-related activities such as ordering admission tickets or event notifications for future events.

In step 936, the system user may preferably determine whether to perform a logoff procedure with user device 114 to thereby terminate access to event server 138. If the system user determines to perform a logoff procedure, then the FIG. 9 process may preferably return to foregoing step 924 until the system user initiates another login procedure. Alternately, in step 940, event server 138 may periodically determine whether access rights for the user device 114 have expired. In the FIG. 9 embodiment, access rights manager 626 of event server 138 may preferably monitor the time-stamped access capabilities of access rights 420 (FIG. 4) and users information 618 (FIG. 6) to determine whether the access rights of the particular user device 114 have expired. In the FIG. 9 embodiment, when event server 138 determines that the access rights of the particular user device 114 have expired, then the FIG. 9 process may preferably terminate.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for providing event content to a system user, comprising:

an event server configured to manage said event content, said event server providing a restricted access to said event content over an electronic network; and a user device configured to communicate with said event server over said electronic network by performing a wireless communications procedure, said user device including a processor, a display, a device memory, a sound module, one or more user interfaces, and input/output interfaces, said input/output interfaces including a wireless communications interface, a network interface, and a removable memory interface, said device memory storing user data related to said system user for sending to said event server to facilitate optimally providing said event content, said user data including at least one of a user profile, event location information, and access rights, said access rights including one or more time-stamped access capabilities that each correspond to a different event service, said time-stamped access capabilities being provided by said event server after receiving said access code from said user device, said user device initially providing an access code to said event server for accessing said event content, said event server responsively providing said event content to said user device until said access code expires.

2. The system of claim 1 wherein said event content includes restricted information that is related to at least one of a specified event, an event location, and one or more participants in said specified event.

3. The system of claim 1 wherein said user device is implemented as at least one of a personal digital assistant device, a cellular telephone device, a computer device, and a portable wireless telecommunications device.

4. The system of claim 1 wherein said user device communicates with said event server through one or more wireless base station transceivers and one or more local area networks, said user device communicating with said event server through at least one of a first direct path from said one or more local area networks, an indirect path from said one or more local area networks through an Internet network, and a second direct path from said user device directly through said Internet network.

5. The system of claim 1 wherein said device memory includes application software, an operating system, device content information, user data, a login/configuration module for providing said access code to said event server, a download module for updating said application software, a profile module, an access rights module, video streaming support services, and a metadata module for managing ancillary data related to a particular event.

6. The system of claim 1 wherein said event server includes a processor, a display, a server memory, one or more user interfaces, and input/output interfaces, said input/output interfaces including at least one of a wireless communications interface and a network interface.

7. The system of claim 6 wherein said server memory includes application software, an operating system, server content information, users information, a login/configuration manager, an upload module for updating device application software, a profile manager, an access rights manager for managing said restricted access to said event content, a video streaming manager, and a metadata manager for managing ancillary data related to a particular event.

8. The system of claim 7 wherein said users information includes one or more sets of user data that each relates to a different one of a plurality of system users for optimally selecting and providing said event content by said event manager, said sets of user data each including at least event location information or access rights.

9. The system of claim 7 wherein said server content information includes at least one of restricted content, free content and public content, said access rights manager of said event server allocating said server content information based on said access code.

10. The system of claim 1 wherein said system user initiates a login procedure during which said user device contacts said event server and provides user data to said event server, said user data including said access code.

11. The system of claim 10 wherein said event server provides configuration information to said user device after receiving said access code, said user device responsively performing a configuration procedure.

12. The system of claim 10 wherein said event server provides application update information to said user device after receiving said user data, said user device responsively performing an application software update procedure.

13. The system of claim 10 wherein said user device obtains and utilizes said restricted access to said event content and other event services from said event server based upon said access code, said access rights manager of said event server providing authorized restricted content and free content based upon unexpired time-stamped access capabilities.

14. The system of claim 13 wherein said system user performs a logoff procedure to disconnect from said restricted access to said event server, said system user performing a subsequent login procedure for reconnecting to said restricted access of said event server.

15. The system of claim 13 wherein said access code expires when said access rights manager detects that all time-stamped access capabilities related to said event content have exceeded a time-stamp threshold value, said event server responsively terminating said restricted access to said event content.

16. The system of claim 1 wherein multiple user devices access said event server from multiple event locations by utilizing a plurality of access codes.

17. A method for providing event content to a system user, comprising:
    managing said event content with an event server that provides a restricted access to said event content over an electronic network; and
    communicating with said event server over said electronic network with a user device that performs a wireless communications procedure, said user device including a processor, a display, a device memory, a sound module, one or more user interfaces, and input/output interfaces, said input/output interfaces including a wireless communications interface, a network interface, and a removable memory interface, said device memory storing user data related to said system user for sending to said event server to facilitate optimally providing said event content, said user data including at least one of a user profile, event location information, and access rights, said access rights including one or more time-stamped access capabilities that each correspond to a different event service, said time-stamped access capabilities being provided by said event server after receiving said access code from said user device, said user device initially providing an access code to said event server for accessing said event content, said event server responsively providing said event content to said user device until said access code expires.

18. The method of claim 17 wherein said event content includes restricted information that is related to at least one of a specified event, an event location, and one or more participants in said specified event.

19. The method of claim 17 wherein said user device is implemented as at least one of a personal digital assistant device, a cellular telephone device, a computer device, and a portable wireless telecommunications device.

20. The method of claim 17 wherein said user device communicates with said event server through one or more wireless base station transceivers and one or more local area networks, said user device communicating with said event server through at least one of a first direct path from said one or more local area networks, an indirect path from said one or more local area networks through an Internet network, and a second direct path from said user device directly through said Internet network.

21. The method of claim 17 wherein said device memory includes application software, an operating system, device content information, user data, a login/configuration module for providing said access code to said event server, a download module for updating said application software, a profile module, an access rights module, video streaming support services, and a metadata module for managing ancillary data related to a particular event.

22. The method of claim 17 wherein said device memory stores user data related to said system user for sending to said event server to facilitate optimally providing said event content, said user data including at least event location information or access rights.

23. The method of claim 17 wherein said event server includes a processor, a display, a server memory, one or more user interfaces, and input/output interfaces, said input/output interfaces including at least one of a wireless communications interface and a network interface.

24. The method of claim 23 wherein said server memory includes application software, an operating system, server content information, users information, a login/configuration manager, an upload module for updating device application software, a profile manager, an access rights manager for managing said restricted access to said event, content, a video streaming manager, and a metadata manager for managing ancillary data related to a particular event.

25. The method of claim 24 wherein said users information includes one or more sets of user data that each relates to a different one of a plurality of system users for optimally selecting and providing said event content by said event manager, said sets of user data each including at least event location information or access rights.

26. The method of claim 24 wherein said server content information includes at least one of restricted content, free content and public content, said access rights manager of said event server allocating said server content information based said access code.

27. The method of claim 17 wherein said system user initiates a login procedure during which said user device contacts said event server and provides user data to said event server, said user data including said access code.

28. The method of claim 27 wherein said event server provides configuration information to said user device after receiving said access code, said user device responsively performing a configuration procedure.

29. The method of claim 27 wherein said event server provides application update information to said user device after receiving said user data, said user device responsively performing an application software update procedure.

30. The method of claim 27 wherein said user device obtains and utilizes said restricted access to said event content and other event services from said event server based upon said access code, said access rights manager of said event server providing authorized restricted content and free content based upon unexpired time-stamped access capabilities.

31. The method of claim 30 wherein said system user performs a logoff procedure to disconnect from said restricted access to said event server, said system user performing a subsequent login procedure for reconnecting to said restricted access of said event server.

32. The method of claim 30 wherein said access code expires when said access rights manager detects that all time-stamped access capabilities related to said event content have exceeded a time-stamp threshold value, said event server responsively terminating said restricted access to said event content.

33. The method of claim 17 wherein multiple user devices access said event server from multiple event locations by utilizing a plurality of access codes.

34. The method of claim 17 wherein said system user utilizes said user device to provide user feedback information to said event server.

35. The method of claim 17 wherein said system user utilizes said user device to communicate with said event server for purchasing an admission to a future event.

36. A system for providing event content to a system user, comprising:

an event server configured to manage said event content, said event server providing a restricted access to said event content over an electronic network; and a user device configured to communicate with said event server over said electronic network by performing a wireless communications procedure, said user device initially providing an access code to said event server for accessing said event content, said user device having one or more time-stamped access capabilities that are each utilized to access a different event service, said time-stamped access capabilities being provided by said event server after receiving said access code from said user device.

* * * * *